United States Patent
Gotohda et al.

(10) Patent No.: US 8,547,399 B2
(45) Date of Patent: Oct. 1, 2013

(54) IMAGE PROCESSING APPARATUS, METHOD, AND PROGRAM USING DEPRESSION TIME INPUT

(75) Inventors: Yukita Gotohda, Tokyo (JP); Karin Kon, Tokyo (JP)

(73) Assignee: Facebook, Inc., Menlo Park, CA (US)

( * ) Notice: Subject to any disclaimer, the term of this patent is extended or adjusted under 35 U.S.C. 154(b) by 900 days.

(21) Appl. No.: 12/471,596

(22) Filed: May 26, 2009

(65) Prior Publication Data
US 2009/0289952 A1    Nov. 26, 2009

(30) Foreign Application Priority Data
May 26, 2008   (JP) .................................. 2008-136592

(51) Int. Cl.
G09G 5/00 (2006.01)
G09G 5/14 (2006.01)
G06T 11/00 (2006.01)
G06T 19/00 (2011.01)

(52) U.S. Cl.
CPC  G09G 5/14 (2013.01); G06T 11/00 (2013.01); G06T 19/00 (2013.01)
USPC ........... 345/629; 345/630; 345/631; 345/632; 345/633; 345/639; 345/670; 345/671

(58) Field of Classification Search
CPC ........... G09G 5/14; G06T 11/00; G06T 19/00
USPC ........................................ 345/629, 639, 671
See application file for complete search history.

(56) References Cited

U.S. PATENT DOCUMENTS

| 5,182,548 | A  * | 1/1993 | Haeberli ..................... 345/639 |
| 5,943,049 | A  * | 8/1999 | Matsubara et al. ........... 715/715 |
| 6,880,132 | B2 * | 4/2005 | Uemura ....................... 715/848 |
| 7,133,658 | B2 * | 11/2006 | Imagawa et al. ............. 455/403 |
| 2002/0032696 | A1* | 3/2002 | Takiguchi et al. ......... 707/500.1 |
| 2002/0043203 | A1* | 4/2002 | Laufer et al. ............. 112/475.19 |
| 2003/0137525 | A1* | 7/2003 | Smith ......................... 345/671 |
| 2004/0125423 | A1 | 7/2004 | Nishi et al. |
| 2004/0239982 | A1* | 12/2004 | Gignac ....................... 358/1.15 |

FOREIGN PATENT DOCUMENTS

| JP | 3-119415 | 5/1991 |
| JP | 9-297858 | 11/1997 |
| JP | 2000-22929 | 1/2000 |
| JP | 2000-022929 | 1/2000 |

OTHER PUBLICATIONS

JP Office Action dated Feb. 14, 2012, with English Translation, Application No. 2008-136592.

* cited by examiner

*Primary Examiner* — Jin-Cheng Wang
(74) *Attorney, Agent, or Firm* — Sheppard, Mullin, Richter & Hampton LLP

(57) ABSTRACT

An image processing apparatus which includes a extension width determination unit for determining a extension width based on a depression time of the cursor at a reference position on an image display unit where a releasing operation of the cursor was performed, which is a time during which the cursor had been kept depressed until the releasing operation was performed, and an ornament piece arrangement unit for arranging the plurality of ornament pieces at positions radially extended away from the reference position with the extension width determined by the extension width determination unit.

19 Claims, 7 Drawing Sheets

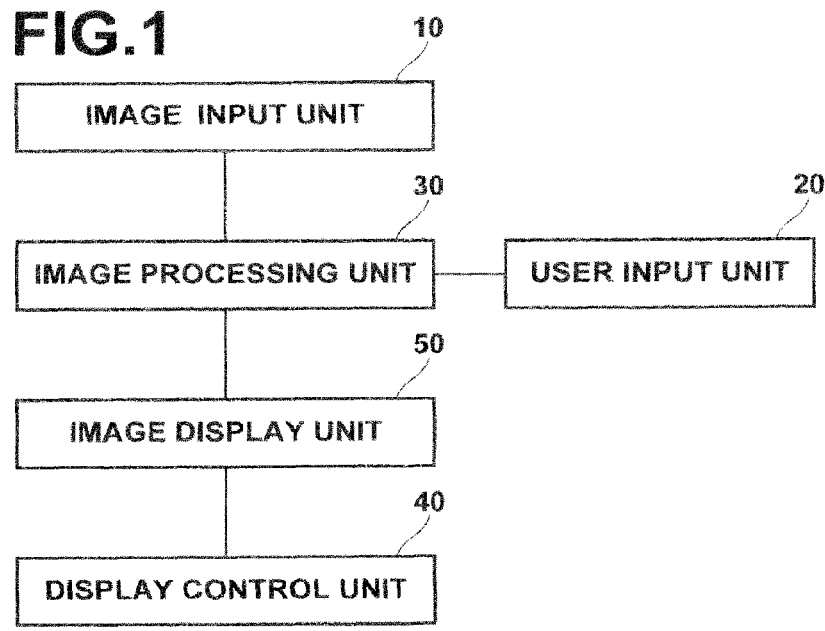
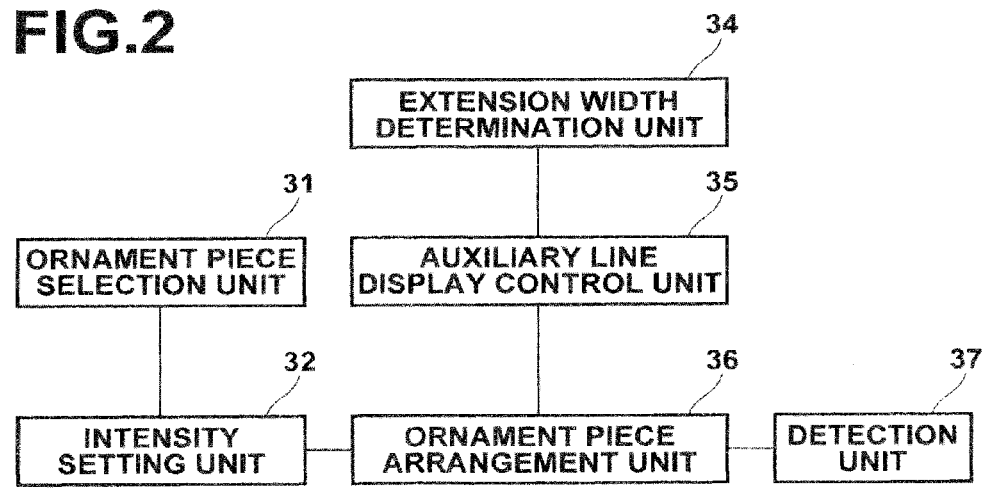

IMAGE PROCESSING APPARATUS, METHOD, AND PROGRAM USING DEPRESSION TIME INPUT

BACKGROUND OF THE INVENTION

1. Field of the Invention

The present invention relates to an image processing apparatus and method for arranging a plurality of ornament pieces in a target area displayed on an image display device based on a cursor operation. The invention also relates to a computer readable recording medium on which is recorded a program for causing a computer to perform the image processing method.

2. Description of the Related Art

Recently, it has been practiced for pleasure to decorate photo images with various types of graphic ornaments, such as flower, heart shape, and the like, and a method in which a photo image to be decorated is display on a display device and a desired ornament piece is arranged at a position directly specified by the user by clicking a cursor or the like is known.

As shown in FIG. 14, Japanese Unexamined Patent Publication No. 2000-022929 (Patent Document 1) proposes a method for automatically arranging ornament pieces at random positions of the background area of photo image 91 other than face area 92.

Further, U.S. Patent Application Publication No. 20040125423 (Patent Document 2) proposes a method for automatically arranging an ornament piece (glasses, false whiskers, or the like) on a person's face area of a photo image by enlarging or reducing the ornament piece according to the size of the face area and positioning the ornament piece so as to match with the image of the face area.

The method in which an ornament piece is arranged at a position specified directly by the user, however, requires a position specifying operation each time an ornament piece is arranged. Therefore, the method has a problem that it requires more time for a larger number of ornament pieces to be arranged. Further, where the user is not accustomed to the positioning for arranging an ornament piece, it is often the case that the arrangement results in unnatural.

Further, the method described in Patent Document 1 in which ornament pieces are arranged automatically at random positions may eliminate the time and effort of the user, but may not reflect user's intention in the arrangement of ornament pieces.

Still further, the method described in Patent Document 2 in which the appropriate arrangement position of an ornament piece is uniquely determined has a problem that the variation of decorative effects provided by the ornament piece is limited.

In view of the circumstances described above, it is an object of the present invention to provide an image processing method and apparatus capable of arranging a plurality of ornament pieces in a manner that reflects user's intention by a simple cursor operation. It is a further object of the present invention to provide a computer readable recording medium on which is recorded a program for causing a computer to perform the image processing method.

SUMMARY OF THE INVENTION

An image processing apparatus of the present invention is an apparatus, including:

an extension width determination unit for determining a extension width based on a depression time of the cursor at a reference position on the image display unit where a releasing operation of the cursor was performed, the depression time being a time during which the cursor had been kept depressed until the releasing operation was performed; and an ornament piece arrangement unit for arranging the plurality of ornament pieces at positions radially extended away from the reference position with the extension width determined by the extension width determination unit.

In the apparatus described above, the extension width determination unit may be a unit that determines the extension width such that the longer the depression time the greater the extension width.

Further, the ornament piece arrangement unit may be a unit that arranges the plurality of ornament pieces along an arrangement line having a predetermined shape and being extended away from the reference position with the extension width determined by the extension width determination unit.

Here, the predetermined shape may be any of circular shape, ellipsoidal shape, polygonal shape, star shape, and heart shape.

The apparatus described above may further include a setting unit for setting at least one of the number, size, and color of ornament pieces to be arranged by the ornament piece arrangement unit.

The setting unit may be a unit that performs the setting based on a depression time of the cursor on a selection button used to select the type of the ornament pieces to be arranged displayed on the image display unit.

Further, the apparatus described above may be an apparatus configured such that the depressing operation of the cursor on the selection button and the releasing operation of the cursor at the reference position are performed in one continuous action.

Still further, in the apparatus described above, the target area may be an area in which a photo image is present, the apparatus may further include a detection unit for detecting an area representing a main subject in the photo image, and the ornament arrangement unit may be a unit that arranges the ornament pieces in the area detected by the detection unit and the other area in different arrangement forms.

An image processing method of the present invention is a method for arranging a plurality of ornament pieces in a target area displayed on a display unit based on an operation of a cursor, the method including the steps of:

determining an extension width based on a depression time of the cursor at a reference position on the image display unit where a releasing operation of the cursor was performed, the depression time being a time during which the cursor had been kept depressed until the releasing operation was performed; and arranging the plurality of ornament pieces at positions radially extended away from the reference position with the extension width determined by the extension width determination unit.

A computer readable recording medium of the present invention is a medium on which is recorded a program for causing a computer to perform the method described above.

In the image processing method, apparatus, and program, the reference position is not limited to a position in the target area and may be any position on the display unit. It is necessary, however, that at least some of the positions radially extended away from the reference position with the extension width determined based on the depression time of the cursor at the reference position are present in the target area for arranging the ornament pieces in the target area.

The term "target area" as used herein broadly refers to an area where ornament pieces are intended to be arranged, and includes an area where contents, such as various types of images, graphics, character strings, or the like are present, as well as an area where no contents are present.

The term "cursor" as used herein refers to an operation position on a screen and not necessarily limited to a dingbat displayed on the screen. Accordingly, the term "operation of a cursor" as used herein refers to riot only the operation of the dingbat on the screen for operating the cursor using an input device for specifying an input position or coordinates on the display screen, such as mouse, infrared or wireless remote control pointing device, or the like, but also a touch panel operation with a finger in which nothing appears on the screen.

Here, for example, when the input device for operating the cursor is a mouse, the terms "depressing operation of the cursor, keeping the cursor depressed, moving the cursor while depressed (dragging operation), and releasing operation of the cursor" as used herein refer to the depressing operation of the mouse button, keeping the mouse button depressed, moving the cursor with the mouse button being depressed, and releasing operation of the cursor respectively. If it is a touch panel, the touching operation to the touch panel with a finger, keeping the finger touched to the panel, moving the touched finger on the panel surface, and releasing operation of the finger from the panel.

Further, the term "depressing operation of the cursor and the releasing operation of the cursor are performed in one continuous action" as used herein refers to that the cursor is kept depressed between the two operations.

According to the image processing method, apparatus, and program of the present invention, when arranging a plurality of ornament pieces in a target area displayed on a display unit based on an operation of a cursor, a extension width is determined based on a depression time of the cursor at a reference position on the image display unit where a releasing operation of the cursor was performed, the depression time being a time during which the cursor had been kept depressed until the releasing operation was performed, and the plurality of ornament pieces are arranged at positions radially extended away from the reference position with the extension width determined by the extension width determination unit. This allows the plurality of ornament pieces to be arranged in a manner that reflects user's intention by a simple cursor operation.

Further, when at least one of the number, size, and color of ornament pieces to be arranged is set based on the duration of keeping the cursor depressed on a selection button used to select the type of the ornament pieces displayed on the image display unit, the user may set the number of ornament pieces to be arranged or the like by an intuitive operation of the cursor.

Still further, when a depressing operation of a cursor on a selection button and a releasing operation of the cursor at a reference position are performed in one continuous action, ornament pieces may be arranged with a less number of operations.

Further, where the target area is an area in which a photo image is present, an area representing a main subject in the photo image is detected, and ornament pieces are arranged in the detected area and the other area in different arrangement forms, then, for example, many ornament pieces may be arranged in an area other than a face area, i.e., the main subject area, of a portrait image, whereby the face image may be emphasized.

BRIEF DESCRIPTION OF THE DRAWINGS

FIG. 1 is a schematic configuration diagram of an image processing workstation according to an embodiment of the present invention.

FIG. 2 is a block diagram of an ornament piece arrangement function of the image processing unit shown in FIG. 1.

DESCRIPTION OF THE PREFERRED EMBODIMENTS

Figure 3:
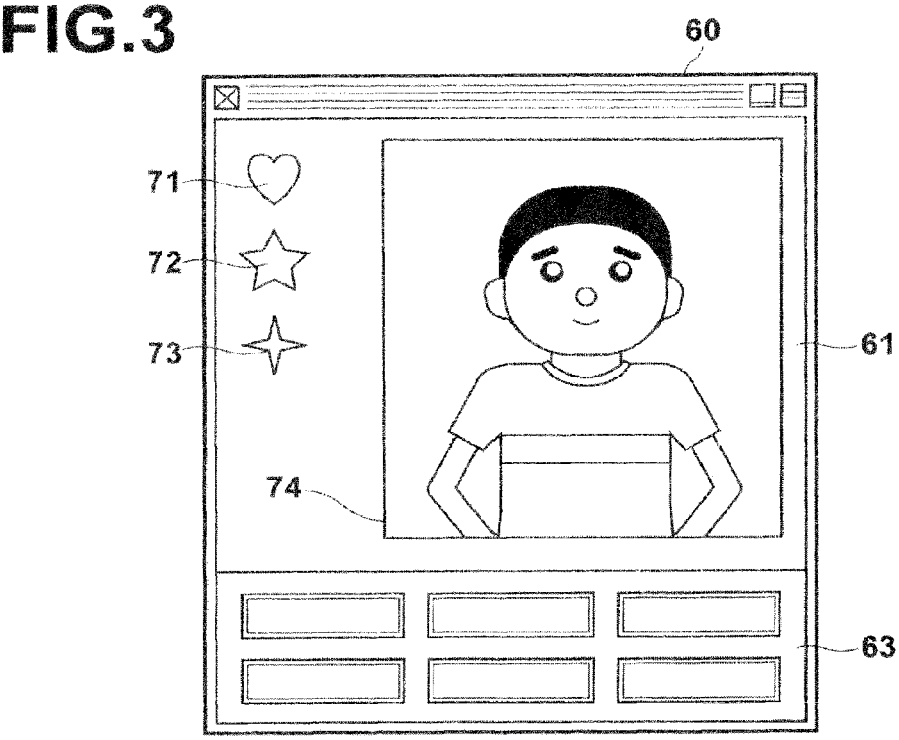
FIG. 3 illustrates an example screen displayed on the image display unit shown in FIG. 1.

Hereinafter, an exemplary embodiment of the present invention will be described with reference to the accompanying drawings.

FIG. 1 is a block diagram of an image processing workstation illustrating the schematic configuration thereof. The image processing workstation is a computer for displaying an inputted image performing image processing in response to an instruction from the user, and displaying a processed image. As shown in FIG. 1, the workstation includes image input unit 10 for receiving a digital image, user input unit 20 for receiving a user instruction, image processing unit 30 for performing image processing on the digital image based on input received by user input unit 20, image display unit 40, such as a display or the like, and display control unit 50 for causing image display unit 40 to display an inputted image, processed image, and the like.

User input unit 20 includes a mouse, a touch panel, a remote control pointing device, or the like for specifying an input position or coordinates on a display screen of image display unit 40. The user may cause the computer to perform image processing to be described later by operating a cursor on a display screen using user input unit 20.

FIG. 2 is a block diagram of a portion of image processing unit 30 related to the function of arranging ornament pieces. Image processing unit 30 is a unit for arranging ornament pieces, for example, on target area 74 (area in which a photo image is present) displayed on display screen 60 shown in FIG. 3 based on a cursor operation. It includes ornament piece selection unit 31, intensity setting unit 32, extension width determination unit 34, auxiliary line display control unit 35, ornament piece arrangement unit 36, and detection unit 37.

Display screen 60 shown in FIG. 3 includes ornament piece selection buttons, image processing area 61 for displaying target area 74, and menu display area 63 for displaying selection menu items used for selecting the type of image processing performed by image processing unit 30.

The configuration of the image processing unit described above is realized by executing an image processing program, read in an auxiliary storage device, on the image processing workstation. Here, the image processing program is stored in information recording medium, such as CD-ROM or the like, or distributed through a network, such as the Internet, and installed on the computer.

Ornament piece selection unit 31 is a unit for selecting, when, for example, a cursor is depressed on one of selection buttons 71, 72, 73 displayed on image processing area 61 shown in FIG. 3, the corresponding type of ornament piece.

Intensity setting unit 32 is a unit for setting the number, size, color, and the like of ornament pieces using predetermined default values or in response to user input. For example, the number of ornament pieces is determined according to the number of depressing operations of cursor on a selection button, duration of operation maintained during the cursor is depressed, depression force when the cursor is depressed using a pressure sensitive touch panel.

Figure 4:
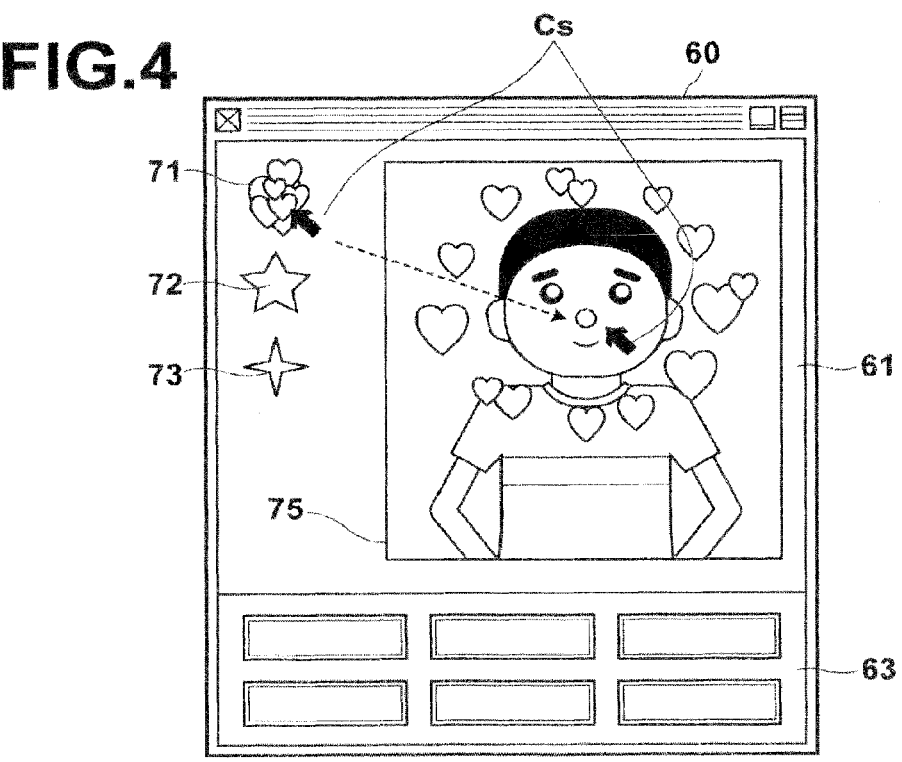
FIG. 4 is a drawing for explaining a selection operation for an ornament piece and a setting operation for the number of pieces to be arranged.

As shown in FIG. 4, an animation may be displayed in which a longer depression time of cursor Cs on a selection button causes more heart shaped ornament pieces to be displayed and more largely.

When arranging ornament pieces of various sizes and colors, the variety of the ornament pieces to be arranged may be controlled by setting the number of colors, number of sizes, and the like.

Further, an arrangement may be adopted in which a setting value of each of a plurality of setting items is predefined for a plurality of stages and a setting value set corresponding to the stage selected according to user input is used. For example, the definition is made such that the number of ornament pieces is set to five in stage 1, in which two of them in red, the rest of three in white, and two of them in large size, another two of them in medium size, and the rest of one in small size, and the number of ornament pieces is set to seven in stage 2, in which two of them in red, three others in white, and the rest of two in blue, and three of them in large size, two others in medium size, and the rest of two in small size.

Extension width determination unit 34 determines the extension width "d" of an arrangement line "E" used for arranging ornament pieces in ornament piece arrangement unit 36 to be described later based on a depression time of cursor Cs at a reference position "P" on display screen 60 where a releasing operation of cursor Cs was performed, which is a time during which cursor Cs had been kept depressed until the releasing operation was performed.

More specifically, for example, the extension width "d" of the arrangement line "E" from the reference position "P" is determined such that the longer the elapsed time from the start of depressing operation of cursor Cs to the releasing operation of cursor Cs, the greater the extension width. Where the arrangement line is a circle, the extension width "d" may be the radius of the circle, and if the arrangement line is an ellipsoid, the extension width "d" may be the radius in a long axis direction.

Here, the arrangement line may have various shapes, such as circular shape, ellipsoidal shape, polygonal shape, star shape, hear shape, S-shape, and the like. Further, the arrangement line is not limited to closed shapes.

Extension width determination unit 34 is not limited to a unit that determines the extension width "d" of the arrangement line "E" such that the longer the depression time of cursor Cs at a reference position "P" where a releasing operation of cursor Cs was performed, which is a time during which cursor Cs had been kept depressed until the releasing operation was performed, the greater the extension width "d". It may be a unit that determines the extension width "d" such that the extension width "d" is gradually reduced from a predetermined reference value as the depression time of cursor Cs is increased.

Figure 5:
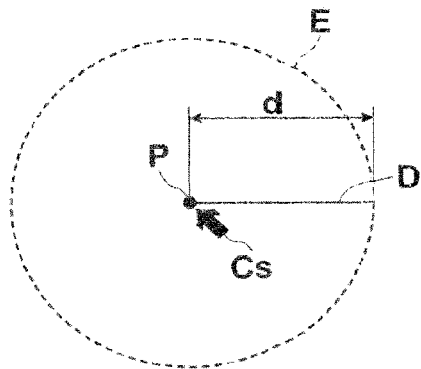
FIG. 5 illustrates an example auxiliary line displayed by the auxiliary line display control unit shown in FIG. 2.

Support line display control unit 35 is a unit for displaying at least either one of an arrangement line "E" and a segment "D" representing the extension width "d" of the arrangement line "E" from a reference position "P" determined at each time point where cursor Cs is released at the reference position "P" during the time from the start of depressing operation of cursor Cs to the releasing operation of cursor Cs at the reference position "P", as shown in FIG. 5. As described above, the arrangement line "E" is defined such that the longer the depression time of cursor Cs at the reference position "P", the greater the extension width "d", so that the auxiliary line (arrangement line "E" and/or segment "D") displayed by auxiliary line display control unit 35 is extended farther away from the reference position "P" as the depression time of cursor Cs at the reference position "P" is extended. This allows the user to predict the relation between the depression time of cursor Cs and the extent where ornament pieces are arranged, so that the user may arrange the ornament pieces in a desired area by referring to an auxiliary line displayed by auxiliary line display control unit 35 while maintaining cursor Cs in depressed state at the reference position "P" and releasing cursor Cs at a time point when the auxiliary line becomes a desired arrangement line "E" (or the extension width "d" thereof).

Figure 6:
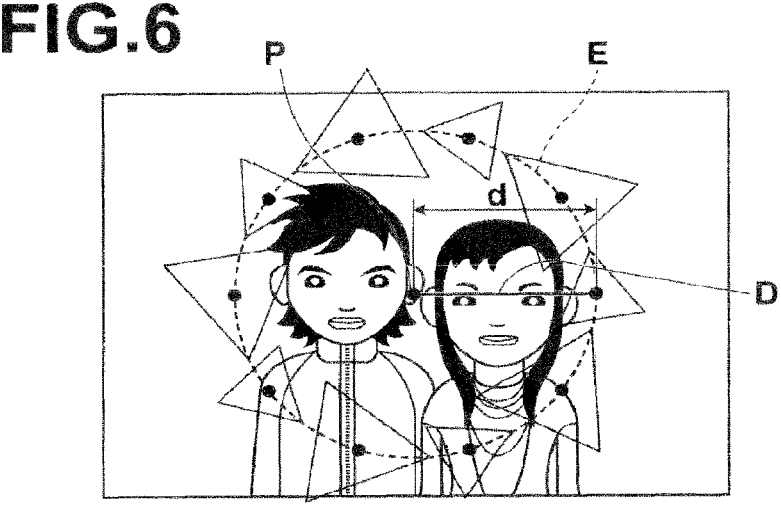
FIG. 6 is a drawing for explaining an arrangement operation of ornament pieces along an arrangement line.
Figure 7:
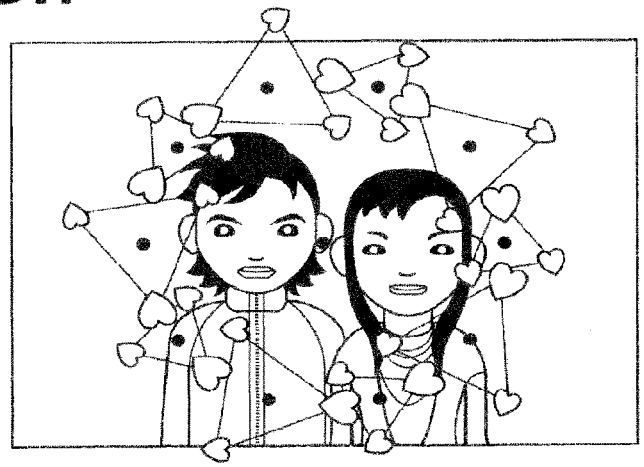
FIG. 7 is a drawing for explaining an arrangement operation of ornament pieces along an arrangement line.

Ornament piece arrangement unit 36 is a unit for arranging ornament pieces along the arrangement line "E" having an extension width "d" from the reference position "P" determined by extension width determination unit 34. For example, the ornament piece arrangement unit 36 sets equally spaced reference points on a circular arrangement line "E" with a radius of extension width "d" centered on a reference position, then with respect to each of the reference points, sets an equilateral triangle having a random size with its gravity point at the reference position, and arranges an ornament piece at each corner of the equilateral triangle, as shown in FIGS. 6 and 7. This produces an image with ornament pieces arranged in the manner shown in FIG. 8.

Figure 8:
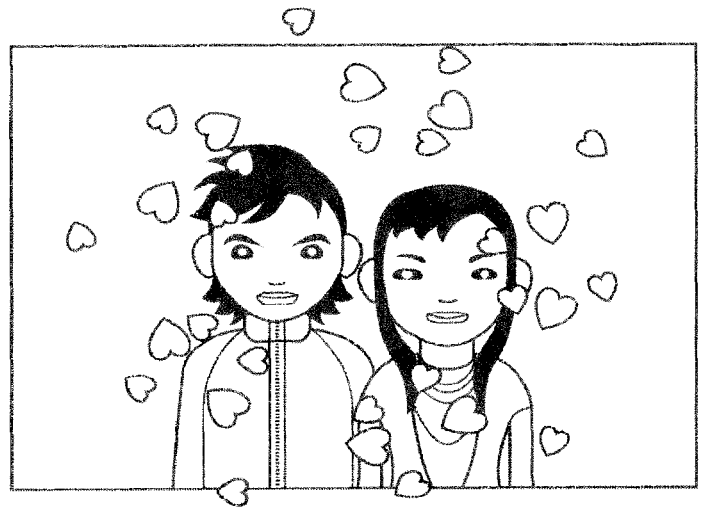
FIG. 8 illustrates an example arrangement in which ornament pieces are arranged along an arrangement line.
Figure 9:
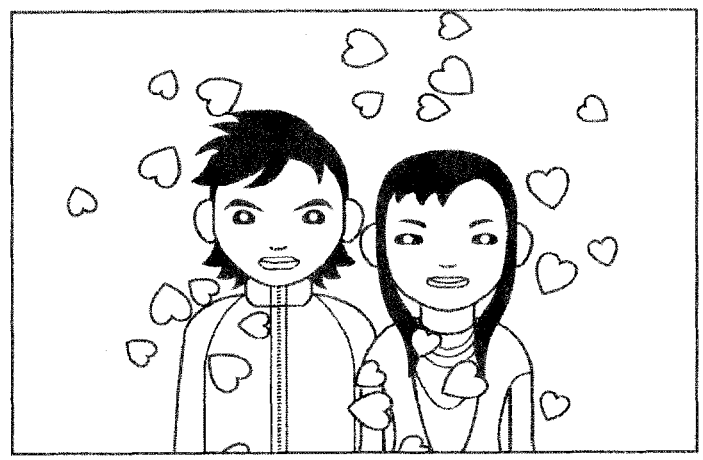
FIG. 9 illustrates an example arrangement in which ornament pieces are arranged so as not to overlap with a face area.
Figure 10:
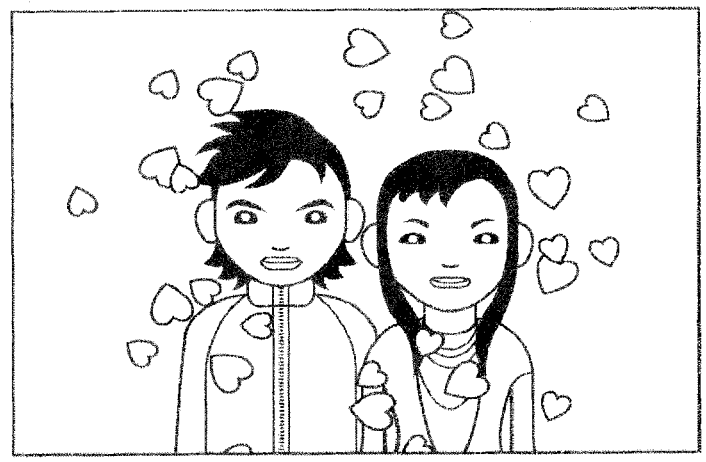
FIG. 10 illustrates another example arrangement in which ornament pieces are arranged so as not to overlap with a face area.

Ornament piece arrangement unit 36 further has a function for arranging ornament pieces in a main subject area and the other area detected by a conventional object detection method in detection unit 37 in different arrangement forms. For example, where the face area in the portrait image shown in FIG. 8 is detected as the main subject, it is possible to delete ornament pieces arranged on the face area as shown in FIG. 9 or otherwise to rotate or reduce the triangles for arranging the ornament pieces so as not to be arranged on the face area, as shown in FIG. 10.

Figure 11:
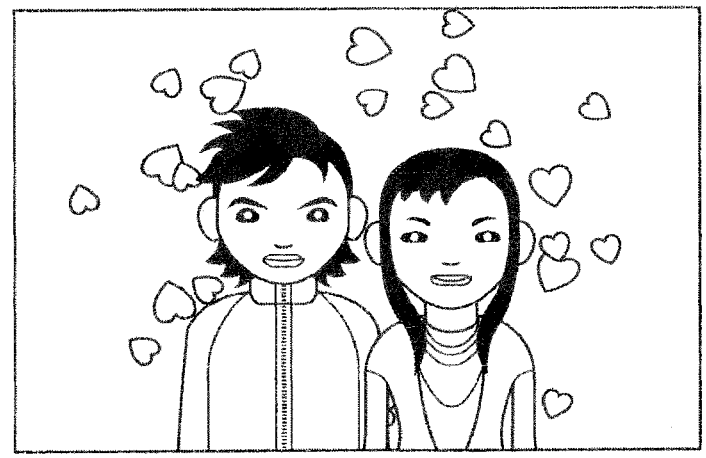
FIG. 11 illustrates still another example arrangement in which ornament pieces are arranged so as not to overlap with a face area.

Further, by treating the detected main subject area as a different layer from that of the other area, for example, the ornament pieces may be arranged at the back of the main subject (here, the entirety of the portrait area) and in front of the other area, as shown in FIG. 11.

In the arrangement of ornament pieces described above, the number of reference points and type of polygonal shape (triangular shape, rectangular shape, combination thereof, and the like) may be determined based on the number of ornament pieces set by intensity setting unit 32, and the spacing between the reference points may be determined according to the size of the photo image.

The size of the polygonal shape set at each reference point may be random. Alternatively, the size may be preset so as to be gradually increased or decreased along the arrangement line.

Further, each polygonal shape may be a shape that has the corresponding reference point at its rough center or at a position away from the center, or a shape rotated at an arbitral angle with respect to a predetermined reference axis having the reference point at its center position.

Figure 12:
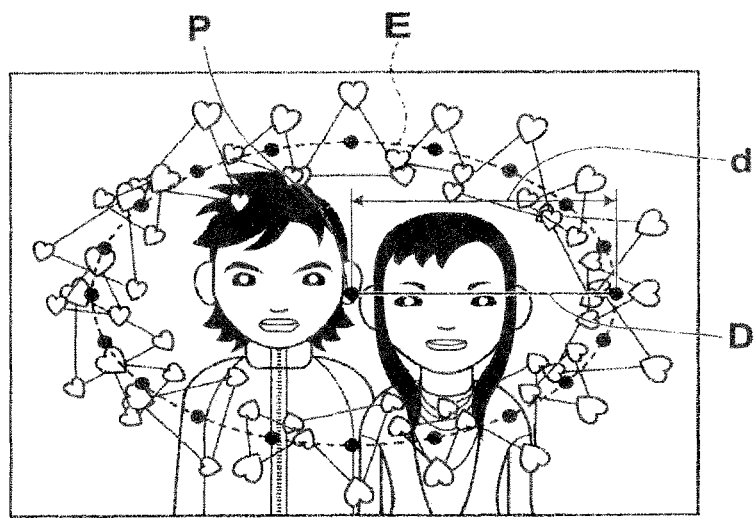
FIG. 12 is a drawing for explaining an arrangement operation of ornament pieces along an ellipsoidal arrangement line.
Figure 13:
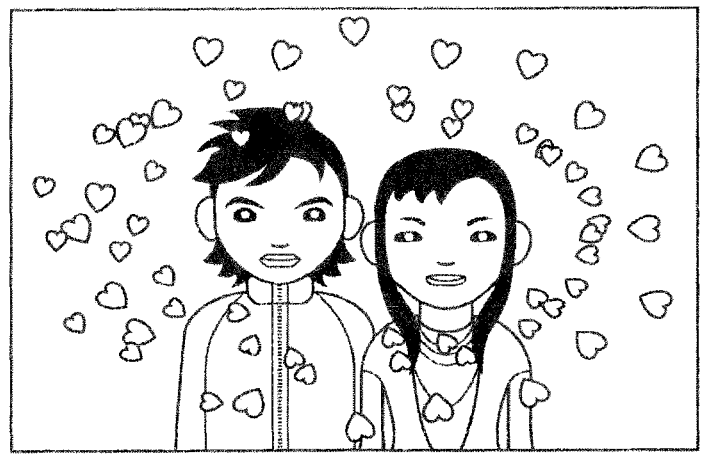
FIG. 13 illustrates an example arrangement in which ornament pieces are arranged along an ellipsoidal arrangement line.
Figure 14:
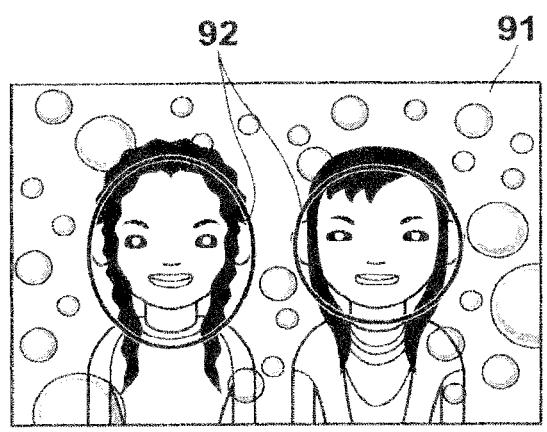
FIG. 14 illustrates an example ornament piece arrangement performed by a conventional method.

FIGS. 12 and 13 illustrate an example case in which ornament pieces are arranged along an ellipsoidal arrangement line "E".

When arranging ornament pieces using the image processing workstation of the present invention configured in the manner described above, the user may arrange, for example, a desired number of ornament pieces in a desired area of a target image by a series of intuitive cursor depressing and releasing operations, that is, by depressing the cursor on a selection button corresponding to the desired type of ornament pieces to be arranged displayed on a display screen, keeping the cursor on the selection button while depressing the cursor until the number, size, and color are set, then moving the cursor to a position that can be the reference position of an arrangement line on which the ornament pieces are arranged while keep depressing the cursor when a desired setting is obtained, and referring to an auxiliary line displayed by auxiliary line display control unit 35 while still keep depressing the cursor at the reference position, and releasing the cursor at a time point when the auxiliary line becomes a desired arrangement line "E" (or the extension width "d" thereof).

In the example operation, the description has been made of a case in which a cursor depressing operation on a selection button for ornament piece selection and the like, and a cursor releasing operation for instructing the ornament piece arrangement are performed in one continuous action. Alternatively, an arrangement may be adopted in which after the cursor depressing operation is performed on a selection button for ornament piece selection, and the Like, the cursor is depressed again and released for arranging the ornament pieces.

The ornament piece is not limited to a graphical shape, such as flower, heart shape, or the like, and it may be, for example, a reduced ordinary image or an object image extracted from an image.

What is claimed is:

1. An image processing apparatus for arranging a plurality of ornament pieces in a target area based on an input operation by a user, the apparatus comprising:
    a display unit operatively connected to a computer processor;
    a hardware input device with i) movement detection for receiving the input operation by a user to move a cursor on the display unit, the input device detecting an operation position of the cursor on the display unit, and ii) depression detection, the input device recognizing a depressed state and a released state from the depression detection of the input device with the cursor being at the detected operation position on the display unit;
    an extension width determination unit, driven by the computer processor, for determining an extension width based on a depression time of the depression detection of the input device with the cursor being located at a reference position on the image display unit, the reference position being a position of the cursor detected by the input device as the operation position of the cursor on the display unit when the recognized state of the input device was changed from the depressed state to the released state, and the depression time being a time during which the input device had been kept depressed until the releasing operation was performed;
    an ornament piece arrangement unit, driven by the computer processor, for arranging the plurality of ornament pieces at plural different positions radially extended away from the reference position at the extension width determined by the extension width determination unit; and
    a setting unit, driven by the computer processor,
    the setting unit, for
    i) based on a detected depressed state from the depression detection and with the cursor detected over one of plural selection buttons on the display unit, selecting a shape-type of the ornament pieces to be arranged by the ornament piece arrangement unit at the determined extension width on the image display unit, each the selection button indicating an available different shape-type of the ornament pieces, and
    ii) based on the depression time from the depression detection with the cursor on the one selection button, setting at least one of
        a number of the selected ornament pieces to be arranged by the ornament piece arrangement unit,
        a size of each of the selected ornament pieces to be arranged by the ornament piece arrangement unit, and
        a color of the selected ornament pieces to be arranged by the ornament piece arrangement unit displayed on the image display unit.

2. The image processing apparatus of claim 1, wherein the extension width determination unit is a unit that determines the extension width such that the longer the depression time the greater the extension width.

3. The image processing apparatus of claim 2, wherein the ornament piece arrangement unit is a unit that arranges the plurality of ornament pieces along an arrangement line having a predetermined shape and being extended away from the reference position with the extension width determined by the extension width determination unit.

4. The image processing apparatus of claim 3, wherein the predetermined shape is any of circular shape, ellipsoidal shape, polygonal shape, star shape, and heart shape.

5. The image processing apparatus of claim 4, wherein:
    the target area is an area in which a photo image is present;
    the apparatus further comprises a detection unit for detecting an area representing a main subject in the photo image; and
    the ornament arrangement unit is a unit that arranges the ornament pieces in the area detected by the detection unit and the other area in different arrangement forms.

6. The image processing apparatus of claim 3, wherein:
    the target area is an area in which a photo image is present;
    the apparatus further comprises a detection unit for detecting an area representing a main subject in the photo image; and
    the ornament arrangement unit is a unit that arranges the ornament pieces in the area detected by the detection unit and the other area in different arrangement forms.

7. The image processing apparatus of claim 2, wherein:
    the target area is an area in which a photo image is present;
    the apparatus further comprises a detection unit for detecting an area representing a main subject in the photo image; and
    the ornament arrangement unit is a unit that arranges the ornament pieces in the area detected by the detection unit and the other area in different arrangement forms.

8. The image processing apparatus of claim 2, wherein:
the target area is an area in which a photo image is present;
the apparatus further comprises a detection unit for detecting an area representing a main subject in the photo image; and
the ornament arrangement unit is a unit that arranges the ornament pieces in the area detected by the detection unit and the other area in different arrangement forms.

9. The image processing apparatus of claim 1, wherein the apparatus is configured such that the depressing operation of the input device on the selection button and the releasing operation of the input device at the reference position are performed in one continuous action.

10. The image processing apparatus of claim 9, wherein:
the target area is an area in which a photo image is present;
the apparatus further comprises a detection unit for detecting an area representing a main subject in the photo image; and
the ornament arrangement unit is a unit that arranges the ornament pieces in the area detected by the detection unit and the other area in different arrangement forms.

11. The image processing apparatus of claim 1, wherein:
the target area is an area in which a photo image is present;
the apparatus further comprises a detection unit for detecting an area representing a main subject in the photo image; and
the ornament arrangement unit is a unit that arranges the ornament pieces in the area detected by the detection unit and the other area in different arrangement forms.

12. The image processing apparatus of claim 1, wherein:
the target area is an area in which a photo image is present;
the apparatus further comprises a detection unit for detecting an area representing a main subject in the photo image; and
the ornament arrangement unit is a unit that arranges the ornament pieces in the area detected by the detection unit and the other area in different arrangement forms.

13. The image processing apparatus of claim 1, wherein,
the setting unit, driven by the computer processor, is configured for setting the number of ornament pieces to be arranged by the ornament piece arrangement unit based on the depression time of the input device on the selection button used to select the shape-type of the ornament pieces to be arranged displayed on the image display unit.

14. The image processing apparatus of claim 1, wherein,
the setting unit, driven by the computer processor, is configured for setting the color of ornament pieces to be arranged by the ornament piece arrangement unit based on the depression time of the input device on the one selection button.

15. An image processing method for arranging a plurality of ornament pieces in a target area based on an operation of a user, the method comprising the steps of:
receiving an input operation by a user from a hardware input device, and based on the input operation, detecting an operation position of a cursor on a digital display unit, and recognizing a depressed state and a released state of the input device with the cursor at the detected operation position;
a computer workstation processor determining an extension width based on a depression time of the input device with the cursor at a reference position on the image display unit, the reference position being a position of the cursor detected by the input device as the operation position of the cursor on the display unit when the recognized state of the input device was performed, the depression time being a time during which the input device had been kept depressed until the releasing operation was performed;
the processor arranging the plurality of ornament pieces at plural different positions radially extended away from the reference position at the extension width determined by the extension width determination unit; and
the processor setting a setting unit
i) based on a detected depressed state with the cursor detected over one of plural selection buttons on the display unit, selecting a shape-type of the ornament pieces to be arranged by the ornament piece arrangement unit at the determined extension width on the image display unit, each the selection button indicating an available different shape-type of the ornament pieces, and
ii) based on the depression time from the depression detection on the one selection button, setting at least one of
a number of the selected ornament pieces to be arranged by the ornament piece arrangement unit,
a size of each of the selected ornament pieces to be arranged by the ornament piece arrangement unit, and
a color of the selected ornament pieces to be arranged by the ornament piece arrangement unit displayed on the image display unit.

16. The image processing method of claim 15, wherein the step of determining an extension width is a step that determines the extension width such that the longer the depression time the greater the extension width.

17. The method of claim 15, wherein the processor sets the setting unit to have the number and color of ornament pieces to be arranged by the ornament piece arrangement unit based on the depression time of the input device on the one selection button.

18. A non-transitory computer readable recording medium on which is recorded a program for arranging a plurality of ornament pieces in a target area displayed on a display unit based on an operation of a user, the program causing a computer to perform the steps of:
receiving an input operation by a user from an input device, and based on the input operation, detecting an operation position of a cursor on the display unit, and recognizing a depressed state and a released state of the input device with the cursor at the detected operation position;
determining an extension width based on a depression time of the input device with the cursor at a reference position on the image display unit, the reference position being a position of the cursor detected by the input device as the operation position of the cursor on the display unit when the recognized state of the input device was performed, the depression time being a time during which the input device had been kept depressed until the releasing operation was performed;
arranging the plurality of ornament pieces at plural different positions radially extended away from the reference position at the extension width determined by the extension width determination unit; and
setting a setting unit
i) based on a detected depressed state with the cursor detected over one of plural selection buttons on the display unit, selecting a shape-type of the ornament pieces to be arranged by the ornament piece arrangement unit at the determined extension width on the image display unit, each the selection button indicating an available different shape-type of the ornament pieces, and
ii) based on the depression time from the depression detection on the one selection button, setting at least one of a number of the selected ornament pieces to be arranged by the ornament piece arrangement unit, a size of each of the selected ornament pieces to be arranged by the ornament piece arrangement unit, and a color of the selected ornament pieces to be arranged by the ornament piece arrangement unit displayed on the image display unit.

19. The non-transitory computer readable recording medium of claim 18, wherein said setting of the setting unit to have the number and color of the ornament pieces to be arranged by the ornament piece arrangement unit based on the depression time of the input device on the one selection button.

* * * * *